Dec. 30, 1969  E. K. BUYZE  3,486,218
METHOD OF FABRICATING A BRAKE DISK
Filed Nov. 22, 1967  2 Sheets-Sheet 1

INVENTOR.
EDWIN K. BUYZE
BY
ATTORNEY

Dec. 30, 1969   E. K. BUYZE   3,486,218
METHOD OF FABRICATING A BRAKE DISK
Filed Nov. 22, 1967   2 Sheets-Sheet 2

INVENTOR.
EDWIN K. BUYZE
BY
ATTORNEY

United States Patent Office 3,486,218
Patented Dec. 30, 1969

3,486,218
METHOD OF FABRICATING A BRAKE DISK
Edwin K. Buyze, St. Clair Shores, Mich., assignor to The Bubb Company, Philadelphia, Pa., a corporation of Pennsylvania
Filed Nov. 22, 1967, Ser. No. 685,006
Int. Cl. T23k 31/02
U.S. Cl. 29—472.3          7 Claims

ABSTRACT OF THE DISCLOSURE

A method of fabricating a brake disk from metal stampings or roll formed parts. The parts are joined together by welding or brazing to provide a more uniform brake disk that requires less finish machining and provides a better quality product than the present cast structure.

---

This invention relates to motor vehicle disk brakes and more particularly to a method of fabrication of the brake disk and mounting means thereof.

The present method of manufacturing ventilating brake disks has been confined to the process of casting the entire brake disk and mounting assembly in one operation and then machining to the finished product. The casting method has been used because of the complicated ventilating features that require rib sections to extend between the braking plate or surfaces of the brake disk. Such casting operations are expensive and require a large number of man hours per brake disk produced.

It is an object of this invention to provide a new method of manufacturing a ventilated brake disk in which the various components are manufactured by stamping or rolling and then assembled in a holding fixture for the joining of the various components. The final assembly of the fabricated brake disk may be accomplished by welding, brazing, or the use of high temperature synthetic resins or bonding agent.

This and other objects of this invention will become apparent by reference to the following specification and drawings wherein.

The ventilated brake disks produced in the brake industry at the present time are formed by casting the metal in the desired form and then machining to the finished shape. The fabricated ventilated brake disk of this invention is a departure from the old established method of manufacturing and is intended to save material and labor in the production of ventilated brake disks.

Figure 2:
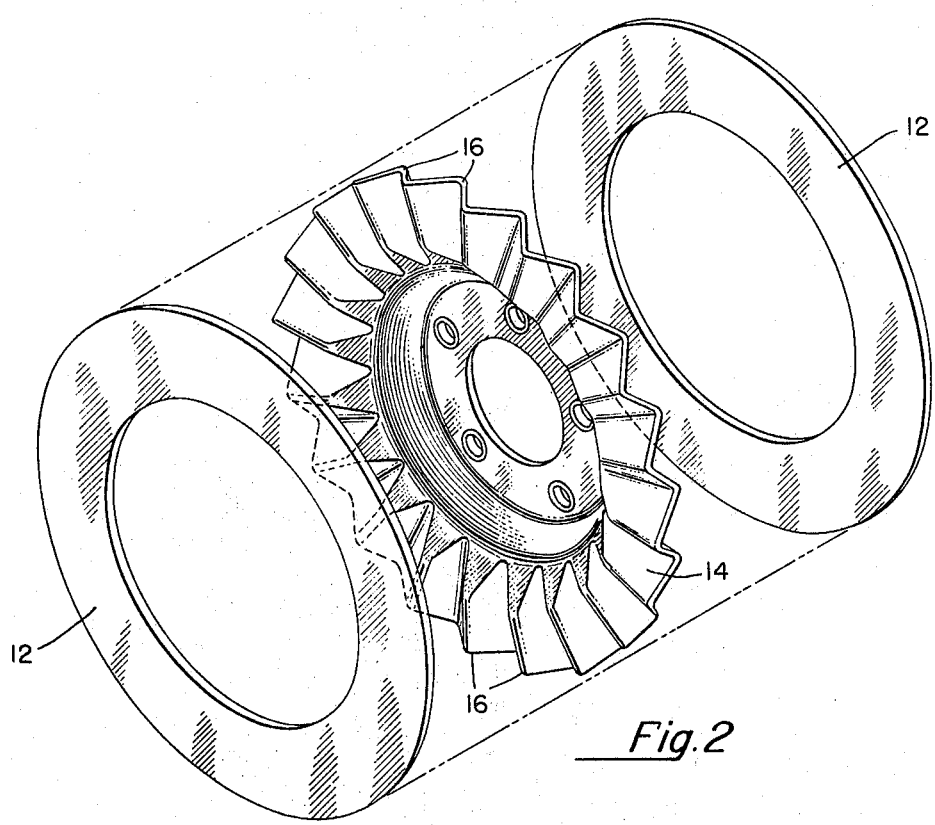
FIG. 2 is an exploded view of the fabricated ventilated brake disk shown in FIG. 1 in which the corrugated spacer and the mounting flange are formed from a single piece of material and the brake plates are separately formed for being attached to the corrugated spacer.
Figure 1:
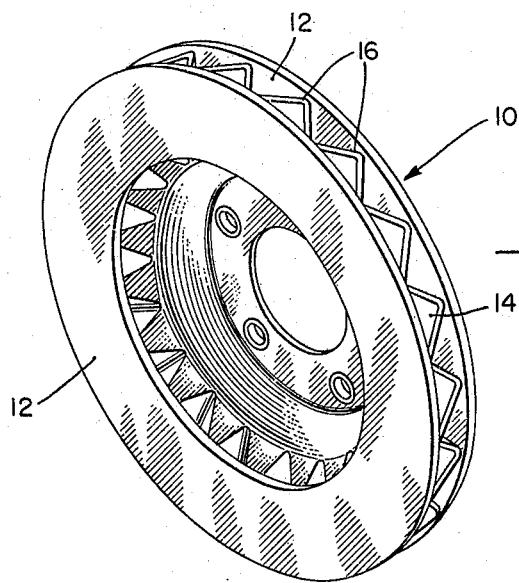
FIG. 1 is an isometric view of the fabricated ventilated brake disk.

The method of manufacturing the fabricated brake disk 10 shown in FIGS. 1 and 2 consists of the steps of blanking the brake plates 12 from sheet or coil stock. Then the combined corrugated spacer and mounting flange 14 are blanked from sheet or coil stock. The three pieces are then assembled in a holding fixture in the relative position shown in FIG. 1, to maintain the ridges 16 of the corrugated spacer in contact with the respective brake plates 12. While in the holding fixture, the brake plates are secured to the corrugated spacers by welding, brazing, and/or use of high temperature adhesives.

The preferred method of joining the brake plates 12 and the corrugated spacers is by means of electron beam welding whereby the fabricated disk is rotated while in the holding fixture with the surfaces exposed to the electron beam welder for welding and securing the three units together. For proper electron beam welding, the ridges 16 should be held within .010 in. of the adjoining brake plate. When the components of the brake disk have been joined, the disk is removed from the holding fixture and placed in a grinding machine so that the outer faces of the brake plates 10 may be ground to substantially parallel surfaces in alignment with the mounting flange.

Figure 4:
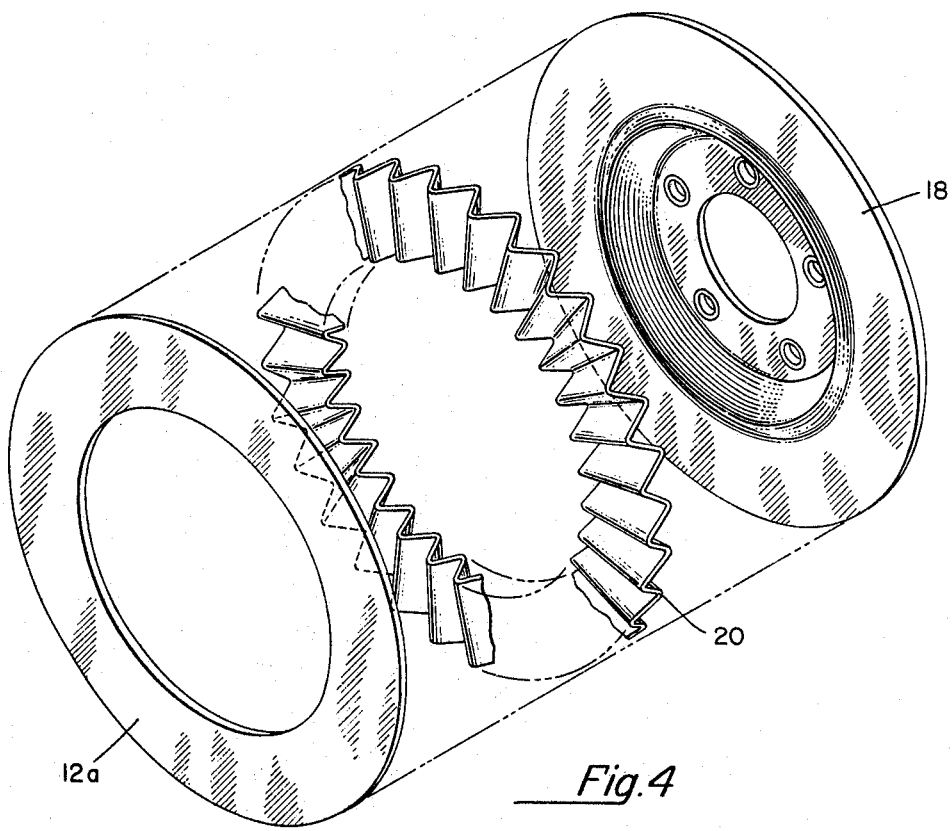
FIG. 4 is an exploded view of the ventilated brake disk shown in FIG. 3 in which one of the brake plates and the corrugated spacer are fabricated from separate materials and the other brake plate and mounting flange are fabricated from a single sheet of material.
Figure 3:
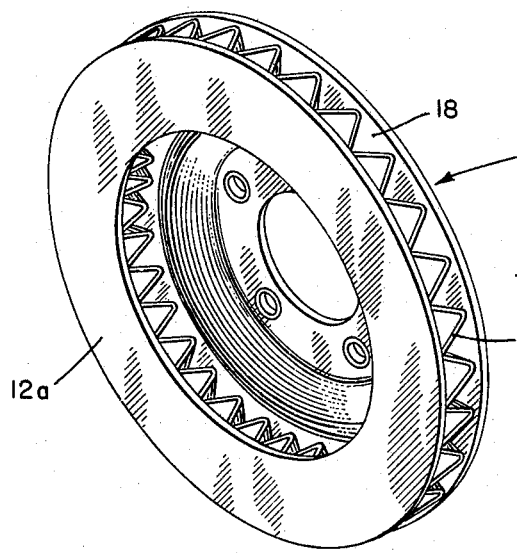
FIG. 3 is an isometric view of the ventilated brake disk similar to FIG. 1.

Referring now to FIGS. 3 and 4, another method of manufacturing a fabricated disk 10a may be used. In this embodiment, a combined brake plate and mounting flange 18 is formed in a single stamping. The corrugated spacer 20 and the other brake plate 12a may be fabricated by one of two methods. The first method would be to stamp the corrugated spacer 20 and the brake plate 12a from coil stock or sheet material. In the second method, the brake plate 12a and/or the corrugated spacer 20 are roll formed from strip stock into a coil. They may also be formed by blanking as described for the method of FIGS. 1 and 2. The coil is then cut into 360° segments, and the ends welded together by a conventional method, such as butt or lap welding, to form the respective brake plate ring 12a or the corrugated spacer ring 20, depending upon the roll form die used. The three components are then placed in a holding fixture as in the method of FIGS. 1 and 2 and the fabrication of the disk is completed in the same manner by welding and grinding of the disk.

While the two methods of manufacturing a fabricated disk have been shown and described, it is obvious that rearrangement of some steps may be made without departing from the spirit and scope of the following claims.

I claim:

1. The method of fabricating a brake disk from a plurality of parts including a pair of brake plates, corrugated spacer means and a mounting flange which comprise the steps of:
   (1) Forming a circular corrugated spacer means, a mounting flange having a mounting surface thereon, and a pair of circular brake plates,
   (2) Placing the corrugated spacer means, mounting flange and brake plates in a holding fixture with the corrugated spacer being positioned in contact with and between the brake plates for maintaining the brake plates and mounting surface in substantially parallel relationship,
   (3) Securing the brake plates, corrugated spacer means and mounting flange to one another while in the assembly fixture,
   (4) Removing the fabricated brake disk from the assembly fixture.

2. The method of fabricating a brake disk as claimed in claim 1 wherein the corrugated spacer means and the mounting flange are formed from a unitary piece of material as a single unit for assemblying in the brake disk.

3. The method of fabricating a brake disk as claimed in claim 1 wherein one of the brake plates and the mounting flange are formed from a unitary piece of material as a single unit for assemblying in the brake disk.

4. The method of fabricating a brake disk as claimed in claim 1 wherein the brake plates are formed by rolling strip stock into a coil shape, cutting segments from the coil, joining the ends of each segment for forming the circular brake plates.

5. The method of fabricating a brake disk as claimed in claim 1 further including the steps of:
   (5) Mounting the fabricated brake disk in a rotatable fixture,
   (6) Grinding the outside surface of each brake plate until the surfaces are parallel.

6. The method of fabricating a brake disk from a plurality of parts including a pair of brake plates, corrugated spacer means and a mounting flange which comprises the steps of:
   (1) Blanking and forming a corrugated spacer and mounting flange from sheet material,
   (2) Rolling strip material into a coil shape, cutting 360° segments from the coil, and joining the ends of the segments for forming brake plates,
   (3) Placing the corrugated spacer and mounting flange on a fixture and then placing a brake plate on opposite sides of the corrugated spacer and holding the corrugated spacer within .010 inch of each brake plate along each corrugation in contact with the respective brake plate,
   (4) Welding the brake plates to the corrugated spacer, to form the fabricated brake disk.

7. The method of fabricating a brake disk as claimed in claim 6 further including the steps of:
   (5) Mounting the fabricated brake disk in a rotatable fixture.
   (6) Grinding the surface most remote from the surface joined to the corrugated spacer of each brake plate sufficiently to make such surfaces parallel to each other.

References Cited

UNITED STATES PATENTS

| | | | |
|---|---|---|---|
| 2,368,621 | 2/1945 | Tack | 188—218 XR |
| 2,986,253 | 5/1961 | Brantingham | 192—113.1 |

JOHN F. CAMPBELL, Primary Examiner

R. B. LAZARUS, Assistant Examiner

U.S. Cl. X.R.

188—218; 192—107, 113.1